United States Patent
Liu et al.

(10) Patent No.: US 12,518,188 B2
(45) Date of Patent: Jan. 6, 2026

(54) METHOD AND SYSTEM FOR DETERMINING MANY-BODY LOCALIZATION STATE, STORAGE MEDIUM, AND PROGRAM PRODUCT

(71) Applicants: Tencent Technology (Shenzhen) Company Limited, Shenzhen (CN); Tsinghua University, Beijing (CN)

(72) Inventors: Shuo Liu, Shenzhen (CN); Shixin Zhang, Shenzhen (CN); Shengyu Zhang, Shenzhen (CN); Hong Yao, Shenzhen (CN)

(73) Assignees: TENCENT TECHNOLOGY (SHENZHEN) COMPANY LIMITED, Shenzhen (CN); TSINGHUA UNIVERSITY, Beijing (CN)

( * ) Notice: Subject to any disclaimer, the term of this patent is extended or adjusted under 35 U.S.C. 154(b) by 626 days.

(21) Appl. No.: 18/072,623

(22) Filed: Nov. 30, 2022

(65) Prior Publication Data
US 2023/0196169 A1    Jun. 22, 2023

Related U.S. Application Data (63) Continuation of application No. PCT/CN2021/136989, filed on Dec. 10, 2021.

(51) Int. Cl.
*G06N 10/00*    (2022.01)
*G06N 10/20*    (2022.01)
(Continued)

(52) U.S. Cl.
CPC .......... *G06N 10/40* (2022.01); *G06N 10/20* (2022.01)

(58) Field of Classification Search
CPC ........ G06N 10/40; G06N 10/20; G06N 10/60; G06N 10/00
See application file for complete search history.

(56) References Cited

U.S. PATENT DOCUMENTS

| 2020/0097848 | A1 | 3/2020 | Woerner et al. |
| 2022/0292385 | A1* | 9/2022 | Sauvage ................ G06N 10/60 |
| 2023/0030423 | A1* | 2/2023 | Rubin .................... G06N 10/20 |

FOREIGN PATENT DOCUMENTS

| CN | 111814362 A | 10/2020 |
| CN | 112906898 A | 6/2021 |

(Continued)

OTHER PUBLICATIONS

Kishor Bharti et al., "Noisy Intermediate-Scale Quantum (NISQ) algorithms", Arxiv.org, Cornell University Library, Oct. 6, 2021, XP091066953, 91 pgs.

(Continued)

*Primary Examiner* — Nghia M Doan
(74) *Attorney, Agent, or Firm* — Morgan, Lewis & Bockius LLP (57) ABSTRACT

A computer system prepares an initial state of a quantum many-body system through a preparation circuit. The quantum many-body system includes a plurality of qubits. The system processes the initial state through a parameterized quantum circuit (PQC) to obtain an output state of the PQC. The output state of the PQC is used for representing an eigenstate of the quantum many-body system. The system measures the output state of the PQC through a measurement circuit. The system obtains a target parameter index based on a measurement result. The target parameter index is used for determining whether the quantum many-body system is in a many-body localization state. In accordance with a determination that the target parameter index satisfies a condition, the system determines that the quantum many-body system is in the many-body localization state.

20 Claims, 3 Drawing Sheets

(51) Int. Cl.
*G06N 10/40* (2022.01)
*G06N 10/60* (2022.01)

(56) References Cited

FOREIGN PATENT DOCUMENTS

CN 113379057 A 9/2021
CN 113408733 A 9/2021

OTHER PUBLICATIONS

Tencent Technology, Extended European Search Report and Supplementary Search Report, EP21937205.9, Sep. 11, 2023, 9 pgs.
Tobias Haug et al., "Capacity and Quantum Geometry of Parametrized Quantum Circuits", Arxiv.org, Cornell University Library, Sep. 16, 2021, XP091044289, 13 pgs.
Youle Wang et al., "Variational quantum Gibbs state preparation with a truncated Taylor series", Arxiv.org, Cornell University Library, May 18, 2020, XP081672029, 23 pgs.
Tencent Technology, WO, PCT/CN2021/136989, Jun. 6, 2022, 3 pgs.
Tencent Technology, IPRP, PCT/CN2021/136989, Apr. 16, 2024, 4 pgs.
Tencent Technology, ISR, PCT/CN2021/136989, Jun. 6, 2022, 2 pgs.

\* cited by examiner

METHOD AND SYSTEM FOR DETERMINING MANY-BODY LOCALIZATION STATE, STORAGE MEDIUM, AND PROGRAM PRODUCT

CROSS-REFERENCE TO RELATED APPLICATIONS

This application is a continuation application of PCT Patent Application No. PCT/CN2021/136989, entitled "METHOD, SYSTEM, STORAGE MEDIUM AND PROGRAM PRODUCT FOR DETERMINING MULTI-BODY LOCALIZATION STATE" filed on Dec. 10, 2021, which claims priority to Chinese Patent Application No. 202111198228.2, filed with the State Intellectual Property Office of the People's Republic of China on Oct. 14, 2021, and entitled "METHOD AND SYSTEM FOR DETERMINING MANY-BODY LOCALIZATION STATE", all of which are incorporated herein by reference in their entirety.

FIELD OF THE TECHNOLOGY

Embodiments of this application relate to the field of quantum technologies, and in particular, to a method and system for determining a many-body localization state, a storage medium, and a program product.

BACKGROUND OF THE DISCLOSURE

A many-body localization (MBL) state is a dynamic phenomenon that occurs in an isolated quantum many-body system. The many-body localization state does not satisfy the eigenstate thermalization hypothesis (ETH), and always retains a memory of an initial condition thereof in a locally observable value. The detection and study of the many-body localization state is a very important direction in condensed matter physics.

Numerically, an exact diagonalization method is often used to study the many-body localization state in a finite-size system. By using the exact diagonalization method, an eigenstate and an eigenvalue of a corresponding Hamiltonian can be solved, and then a change behavior of a physical quantity, such as entropy of entanglement, of a system can be studied as the system evolves over time, to determine whether the system is in a many-body localization state. Since a dimension of the Hilbert space corresponding to the Hamiltonian increases exponentially with a size of the system, compared with a thermodynamic limit, the size of the system that can be studied by using the exact diagonalization method is very small due to the limitation of a calculation capability of a classical computer. A quantum computer may break through a calculation limit of the classical computer, and study many-body localization states closer to the thermodynamic limit.

In the related art, it is proposed to study a change behavior of a many-body localization state with time by using a manner of implementing time evolution in a quantum circuit. In the implementation of the quantum circuit, an exponential operator corresponding to the time evolution may be decomposed through Trotter, then time evolution of a physical system is simulated on the circuit, and whether the system is in a many-body localization state is determined by observing whether the system is thermalized after a long evolution time.

However, the time required for observing a behavior of a physical quantity, such as entropy of entanglement, of a system and determining whether the system is thermalized through time evolution is much longer than a coherence time of an existing quantum computer, and a sufficiently deep quantum circuit is required, which results in significant quantum noise, thereby failing to obtain an effective measurement result.

SUMMARY

Embodiments of this application provide a method and system for determining a many-body localization state, a storage medium, and a program product. The technical solutions are as follows.

According to an aspect of the embodiments of this application, a method for determining a many-body localization state is provided. The method is performed by a computer device, and includes:
  preparing an initial state of a quantum many-body system through a preparation circuit, the quantum many-body system including a plurality of qubits;
  processing the initial state through a parameterized quantum circuit (PQC) to obtain an output state of the PQC, the output state of the PQC is used for approximately representing an eigenstate of the quantum many-body system;
  measuring the output state of the PQC through a measurement circuit, and obtaining a target parameter index based on a measurement result, the target parameter index is used for determining whether the quantum many-body system is in a many-body localization state; and
  determining, when the target parameter index satisfies a condition, that the quantum many-body system is in the many-body localization state.

According to an aspect of the embodiments of this application, a system for determining a many-body localization state is provided. The system includes: a preparation circuit, a PQC, a measurement circuit, and a classical calculation module,
  the preparation circuit being configured to prepare an initial state of a quantum many-body system, the quantum many-body system including a plurality of qubits;
  the PQC being configured to process the initial state, to obtain an output state of the PQC, the output state of the PQC being used for approximately representing an eigenstate of the quantum many-body system;
  the measurement circuit being configured to measure the output state of the PQC; and
  the classical calculation module being configured to: obtain a target parameter index based on a measurement result of the measurement circuit, the target parameter index being used for determining whether the quantum many-body system is in a many-body localization state; and determine, when the target parameter index satisfies a condition, that the quantum many-body system is in the many-body localization state.

According to an aspect of the embodiments of this application, a computer device is provided. The computer device is configured to perform the foregoing method.

According to an aspect of the embodiments of this application, a non-transitory computer-readable storage medium is provided. The computer-readable storage medium stores at least one instruction, at least one program, a code set, or an instruction set, the at least one instruction, the at least one program, the code set, or the instruction set being loaded and executed by a processor to implement the foregoing method for determining a many-body localization state.

According to an aspect of the embodiments of this application, a computer program product or a computer program is provided, the computer program product or the computer program including computer instructions, the computer instructions being stored in a computer-readable storage medium, a processor of a computer device reading the computer instructions from the computer-readable storage medium, and the processor executing the computer instructions to implement the foregoing method for determining a many-body localization state.

The technical solutions provided in the embodiments of this application may include the following beneficial effects:

By applying an "excited state variational quantum eigensolver" as a tool to determine and analyze many-body localization states, and by constructing a system architecture that includes a preparation circuit, a PQC, and a measurement circuit, the many-body localization state can be studied through the excited state variational quantum eigensolver on a quantum circuit. Using quantum advantages, it is possible to study many-body localization states in larger and higher-dimensional systems that were previously limited by the limits of classical computing. In addition, compared with the traditional method in which many-body localization states is determined by applying time evolution, this application determines the many-body localization state by performing "controlled time evolution" to measure an entanglement criterion, therefore using fewer quantum resources, the line depth of the circuit is shallower, and is less affected by noise.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes the implementations of this application in detail with reference to the accompanying drawings.

Before the technical solutions of this application are described, some key terms involved in this application are explained first.

1. Quantum calculation refers to a calculation manner based on quantum logic, and a basic unit for storing data is a qubit.

2. The qubit is a basic unit of quantum calculation. A conventional computer uses 0 and 1 as basic binary units. Quantum computing can process 0 and 1 bits at the same time, and a system can be in a linear superposition state of 0 and 1: $|\psi\rangle = \alpha|0\rangle + \beta|1\rangle$, and $\alpha$, $\beta$ represent complex probability amplitude of the system at 0 and 1. Modular squares $|\alpha|^2$, $|\beta|^2$ of $\alpha$, $\beta$ respectively represent probabilities of being at 0 and 1, respectively.

3. The quantum circuit is a representation of a general-purpose quantum computer, and represents hardware implementation of a corresponding quantum algorithm/program under a quantum gate model. When a quantum circuit includes an adjustable parameter for controlling a quantum gate, the quantum gate is referred to as a parameterized quantum circuit (PQC) or a variational quantum circuit (VQC), both of which are the same concept.

4. Hamiltonian is a matrix of a Hermitian conjugate for describing total energy of a quantum system. Hamiltonian is a physical word, an operator for describing a total energy of a system, and is usually represented by H.

5. The eigenstate means that, for a Hamiltonian matrix H, a solution that satisfies the equation $H|\psi\rangle = E|\psi\rangle$ is referred to as an eigenstate $|\psi\rangle$ of H and has eigenenergy E. A ground state corresponds to an eigenstate with lowest energy in a quantum system.

6. Hybrid quantum-classical calculation refers to a calculation paradigm in which an inner layer uses a quantum circuit (such as a PQC) to perform calculation to obtain a corresponding physical quantity or loss function, and an outer layer uses a conventional classical optimizer to adjust a variational parameter of the quantum circuit, which can give full play to an advantage of the quantum calculation, and is considered as an important direction that has the potential to show the quantum advantage.

7. Noisy intermediate-scale quantum (NISQ) refers to recent noisy intermediate-scale quantum hardware, which is a current development stage and a key studying direction of quantum calculation. In this phase, quantum calculation cannot be used as an engine for general-purpose calculation due to limitations of a scale and noise, but can already surpass results from a most powerful classical computer in some problems, which is often referred to as quantum supremacy or quantum advantage.

8. The variational quantum eigensolver (VQE) estimates ground state energy of a specific quantum system through a variational circuit (that is, a PQC/VQC), which is a typical hybrid quantum-classical calculation paradigm that is widely applied to the field of quantum chemistry. Based on the above, many methods for estimating excited state energy of a specific quantum system have been developed, for example, a loss function uses an excited state VQE with an energy variance.

9. The eigenstate thermalization hypothesis (ETH) reads as follows: when an isolated quantum system experiences sufficiently long time evolution, an expected value of a physical observation variable converges to a predicted value of a thermal equilibrium, and has small fluctuations relative to the predicted value. Thermalization refers to a phenomenon in which a physical system evolves to an equilibrium state. The ETH means that an eigenstate of a Hamiltonian of an isolated system shows a property of thermalization.

10. A many-body localization (MBL) state is a dynamic phenomenon that occurs in an isolated quantum many-body system. The many-body localization state does not satisfy the ETH, and always retains a memory of an initial condition thereof in a locally observable value. The detection and study of MBL is a very important direction in condensed matter physics.

11. The eigenspace inverse participation ratio (EIPR) is used for determining a degree to which a wave function is converged to an eigenstate of a system. When the wave function is $|\psi\rangle = \Sigma_i \phi_i |i\rangle$, and $H|i\rangle = \lambda_i |i\rangle$, the EIPR is defined as: $\Sigma_i |\phi_i|^4$. H represents a Hamiltonian, $|i\rangle$ represents an ith eigenstate of the Hamiltonian, $\phi_i$ represents a component corresponding to the ith eigenstate, $\lambda_i$ represents an ith eigenvalue, and $|\phi_i|$ represents a modulus of the component corresponding to the ith eigenstate, i being a positive integer.

12. A Pauli string is a term composed of a direct product of a plurality of Pauli operators at different lattice points. A general Hamiltonian can usually be decomposed into a sum of a set of Pauli strings. The VQE generally performs measurement item by item according to Pauli string decomposition.

13. The unitary coupled cluster (UCC) ansatz and hardware efficient ansatz are two different variational circuit structures of the VQE. The former draws on a traditional variational numerical method coupled-cluster of quantum chemistry, and has a better approximation effect, but is required to decompose a corresponding exponential operator through Trotter, thereby having a relatively high requirement on quantum resources. The latter adopts a policy in which native quantum gate sets are densely arranged directly, thereby requiring a shallower circuit, and having a relatively low requirement on the quantum resources. However, corresponding expression and approximation capabilities thereof are also worse than the UCC ansatz.

14. The Pauli operator, also referred to as the Pauli matrix, is a set of three 2×2 complex unitary and Hermitian matrices (also referred to as unitary matrices), and usually represented by the Greek letter σ (Sigma). A Pauli X operator is $$\sigma_x = \begin{bmatrix} 0 & 1 \\ 1 & 0 \end{bmatrix},$$

a Pauli Y operator is $$\sigma_y = \begin{bmatrix} 0 & -i \\ i & 0 \end{bmatrix},$$

and a Pauli Z operator is $$\sigma_z = \begin{bmatrix} 1 & 0 \\ 0 & -1 \end{bmatrix}.$$

15. The bit string is a string of numbers including 0 and 1. classical results obtained through each measurement of a quantum circuit may be respectively represented by 0 and 1 according to a lower part and an upper part of a spin configuration on a measurement basis. Therefore, the measurement results are summarized to correspond to a bit string.

16. The entanglement criterion means that a system is controlled to perform time evolution through an auxiliary qubit, and a reduced density matrix of the auxiliary qubit is denoted as $\rho_{reduced}$. The entanglement criterion is defined as: $Tr(\rho_{reduced}^2)$, Tr representing calculation of a trace of a matrix. A value thereof may further be used for determining an effect of an excited state VQE.

17. Spin refers to an intrinsic motion caused by an intrinsic angular momentum of a particle. In quantum mechanics, spin is an intrinsic property of a particle, and an operation rule thereof is similar to an angular momentum of classical mechanics. Consequently, a magnetic field is generated.

18. Quantum gate means that, in quantum computing, especially in a computing model of a quantum circuit, a quantum gate (or a quantum logic gate) is a basic quantum circuit for operating a small quantity of qubits.

This application provides a new solution for detecting a many-body localization state, which is more suitable for NISQ hardware. In this solution, an "excited state variational quantum eigensolver" is used as a tool for determining and analyzing the many-body localization state that is extremely important in condensed matter physics. In addition, this solution has been verified numerically and experimentally. In this application, effectiveness and superiority of this solution in numerical computation and a quantum hardware experiment are demonstrated and illustrated. By optimizing a system to a magnitude of a PQC depth required for an "equivalent zero point", the many-body localization state can be well distinguished from a thermalization state, and by taking advantage of the quantum advantage, it is possible to study the many-body localization state in a larger and higher-dimensional system that cannot be studied before due to a classical calculation limit. This solution has been verified on both a noisy simulator and real quantum hardware that take into account quantum noise and an inherent measurement error. In addition, compared with a conventional method in which the many-body localization state is determined by performing time evolution, in this solution, quantum resources required are less, a depth of the circuit is shallower, and influence caused by noise is smaller.

For a size and a dimension of a quantum system, descriptions are given as follows: the quantum system may be considered as a set including a plurality of qubits, and these qubits interact with each other. The "size" refers to a quantity of qubits included in the quantum system, and the more the qubits, the larger the "size" of the system. The "dimension" refers to a quantity of dimensions of a space of the system. For example, a line is one-dimensional, and a plane is two-dimensional. In a one-dimensional system that is studied recently, it can be regarded as linear arrangement of many qubits.

The technical solutions provided in this application can speed up and strengthen application of a variational quantum algorithm in studying the condensed matter physics at a current stage, and is expected to become key application on quantum hardware in the near future. The solutions of this application do not depend on a specific model, nor on a specific ansatz (the ansatz herein refers to a type and an arrangement manner of some quantum gates of a PQC in an excited state variational quantum eigensolver) of the "excited state variational quantum eigensolver", thereby having high generalibility.

Typical shortcomings of quantum hardware in the NISQ era are that a coherence time is short and quantum noise is high. Correspondingly, when features of the quantum hardware are fully considered, application of the quantum hardware in condensed matter physics or other fields needs to be considered. The "excited state variational quantum eigensolver" is a means for detecting a many-body localization state that is suitable for the NISQ hardware. In this means, quantum resources required are less, influence caused by noise is small, and a time required by the system for performing time evolution is less than the coherence time of the current hardware. In the solution of this application, detection of the many-body localization state may be implemented on a relatively shallow variational quantum circuit, that is, whether the system is in the many-body localization state is determined through some measurement. The solution of this application is especially applicable to hardware at a current stage, thereby accelerating verification on an effective quantum advantage and application of the effective quantum advantage in different fields.

Figure 1:
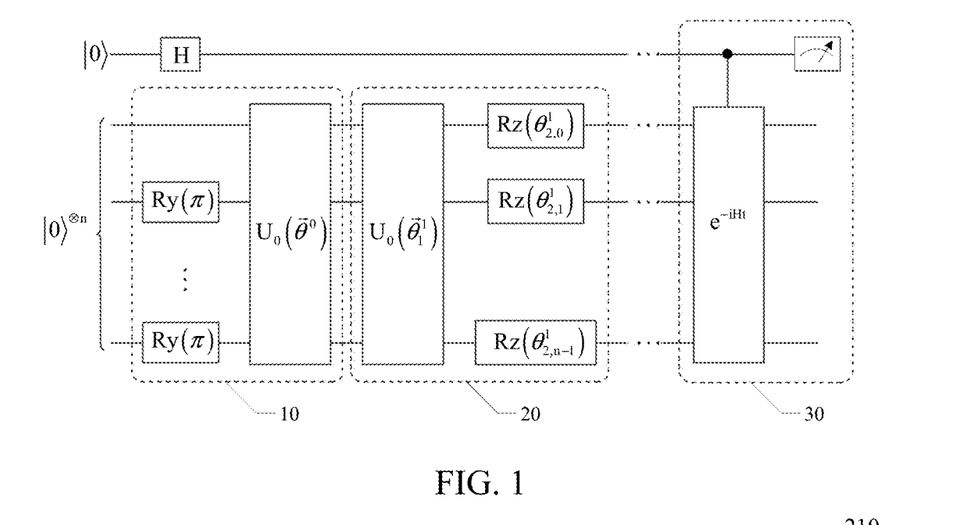
FIG. 1 is a schematic diagram of a system for determining a many-body localization state according to an embodiment of this application.

First, a system architecture involved in this application is described. FIG. 1 is a schematic diagram of a system for determining a many-body localization state according to an embodiment of this application. The system is constructed based on a framework of an "excited state variational quantum eigensolver". As shown in FIG. 1, the system includes: a preparation circuit 10, a PQC 20, and a measurement circuit 30. The three parts of circuits are quantum circuits. The preparation circuit 10 is configured to prepare an initial state of a quantum many-body system, the quantum many-body system including a plurality of qubits. The PQC is configured to process the foregoing initial state, to obtain an output state of the PQC 20. The PQC 20 is configured to approximately represent an eigenstate of the quantum many-body system. The measurement circuit 30 is configured to measure the output state of the PQC 20. Then, a target parameter index is obtained based on a measurement result of the measurement circuit 30. The target parameter index is used for determining whether the quantum many-body system is in a many-body localization state. When the target parameter index satisfies a condition, it is determined that the quantum many-body system is in the many-body localization state. In some embodiments, the system further includes a classical calculation module (not shown in FIG. 1). The classical calculation module is configured to perform operations related to classical calculation, for example, to obtain the target parameter index based on the measurement result of the measurement circuit 30, and to determine whether the target parameter index satisfies the condition.

Figure 2:
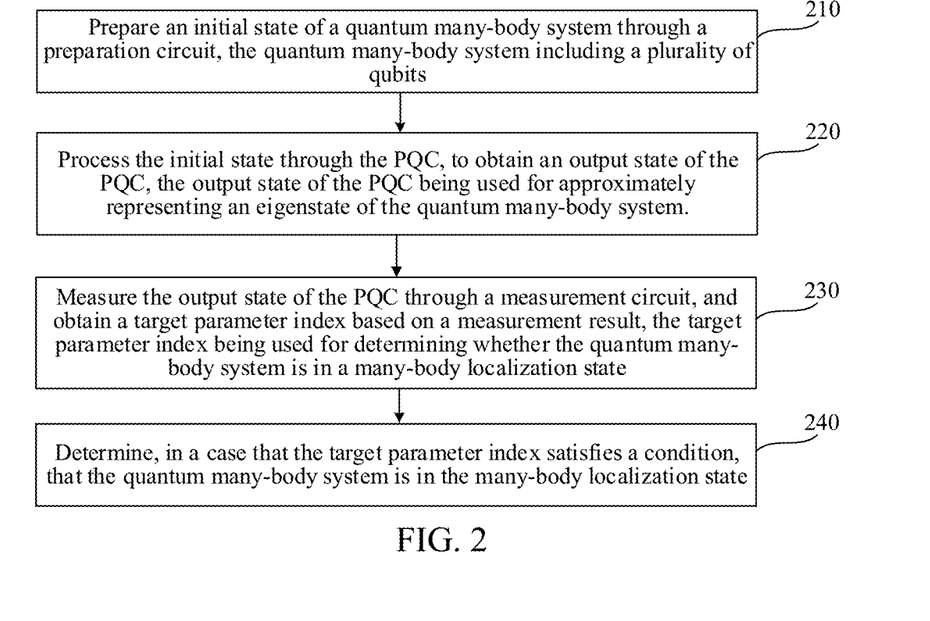
FIG. 2 is a flowchart of a method for determining a many-body localization state according to an exemplary embodiment of this application.

The following describes the method embodiments of this application with reference to a system architecture shown in FIG. 1. FIG. 2 is a flowchart of a method for determining a many-body localization state according to an embodiment of this application. The method may be applied to the system framework in FIG. 1, and may include the following steps (210 to 240):

Step 210: Prepare an initial state of a quantum many-body system through a preparation circuit, the quantum many-body system including a plurality of qubits.

In some embodiments, an input state of the preparation circuit is prepared, and then the input state is processed through the preparation circuit, to obtain an initial state of the quantum many-body system. The input state of the preparation circuit may generally use an all 0 state.

In some embodiments, the preparation circuit includes a first sub-circuit and a second sub-circuit. The input state of the preparation circuit is processed through the first sub-circuit, to obtain an output state of the first sub-circuit. Then, the output state of the first sub-circuit is processed through the second sub-circuit, to obtain the initial state of the quantum many-body system. The second sub-circuit is configured to generate entanglement between different qubits.

In some embodiments, the first sub-circuit in the preparation circuit is configured to prepare the input state of the preparation circuit as a state in a sub-space with magnetization of $M_z=0$, e.g., an antiferromagnetic state. For example, the input state of the preparation circuit is the all-zero state, the first sub-circuit may include several $R_y$ quantum gates, and the foregoing all-zero state may be converted into an antiferromagnetic state through the first sub-circuit. A $R_y$ quantum gate may be referred to as a rotating quantum gate around a spin y-axis, and a representation form of a matrix thereof is $$Ry = \begin{bmatrix} \cos(\theta/2) & -\sin(\theta/2) \\ \sin(\theta/2) & \cos(\theta/2) \end{bmatrix}.$$

For example, the input state of the preparation circuit is the all 0 state |0000 . . . >, and it is expected that the antiferromagnetic state |0101 . . . > is obtained through the first sub-circuit. Therefore, it is only necessary to act on the $R_y$ quantum gate at an even-numbered lattice point. A reason why to prepare the antiferromagnetic state is that the sub-space with magnetization of $M_z=0$ is physically important.

The second sub-circuit in the preparation circuit is configured to process the output state of the first sub-circuit, to obtain the initial state of the quantum many-body system (that is, an input state of the PQC). In some embodiments, when the quantum many-body system has a specific property, the second sub-circuit maintains the specific property of the quantum many-body system. For example, the specific property indicates a property of conservation of magnetization, and is referred to as U(1) symmetry. When the quantum many-body system has the U(1) symmetry, the second sub-circuit maintains the U(1) symmetry of the quantum many-body system. The magnetization of $M_z=\Sigma_i\sigma_i^z$ of the quantum many-body system is conserved, where $\sigma^z$ is a Pauli operator in a Z direction (that is, a Pauli-Z operator), i represents a position of a qubit/lattice point, that is, i represents an ith qubit/lattice point, and i is a positive integer.

Using the preparation circuit 10 shown in FIG. 1 as an example, the input state of the preparation circuit 10 is the all-zero ("0") state, that is, n qubits prepared by initialization are all in the 0 states, where n is an integer greater than 1. When the quantum many-body system under study has the U(1) symmetry, the property of the system in the subspace with magnetization of $M_z=0$ is concerned. The system may be changed from an initial |0000 . . . > direct product state into an antiferromagnetic state |0101 . . . > by using a layer of $R_y$ quantum gates. Then, a dual-bit gate $U_0(\vec{\theta}^0)$ maintaining the U(1) symmetry is used to generate entanglement between different qubits of the system, to prepare the initial state inputted into the PQC 20. For example, the dual-bit gate $$U_0(\vec{\theta}^0) = \exp\left(\frac{i\pi\theta}{4}(X \otimes X + Y \otimes Y)\right),$$

where X and Y represent Pauli operators, θ is a variational parameter, and i represents an imaginary unit. Certainly, the dual-bit gate may also use another structure capable of maintaining the U(1) symmetry, such as an iSWAP dual-bit gate, which is not limited in this application.

For a certain kind of quantum many-body system, some parameters of the system are adjusted, and the system has two completely different phases: a thermalization state and a many-body localization state. In the embodiments of this application, for the thermalization state and the many-body localization state, the initial states of the quantum many-body system prepared by the preparation circuit are the same.

For example, an Aubry-André (AA) model that is known to have many-body localization phase transition may be used to verify effectiveness of this solution. A Hamiltonian form of the model is as follows:

$$H = \sum_i (\sigma_i^x \sigma_{i+1}^x + \sigma_i^y \sigma_{i+1}^y) + V_0 \sum_i \sigma_i^z \sigma_{i+1}^z + W \sum_i \cos(2\pi\eta i + \phi)\sigma_i^z$$

$\sigma^x$, $\sigma^y$, $\sigma^z$ are Pauli operators, i represents a position of a qubit/lattice point, and $\eta$ and $\phi$ may be set values. Parameters of the model include $V_0$ and $W$ in the foregoing formula. When the parameters are in a certain range, the system enters the many-body localization state.

Step 220: Process the initial state through the PQC, to obtain an output state of the PQC, the output state of the PQC being used for approximately representing an eigenstate of the quantum many-body system.

In some embodiments, after the PQC is used to enable the initial state of the quantum many-body system to pass through the PQC, a certain eigenstate of the quantum many-body system is obtained. That is, a parameter of the PQC is optimized, so that after the initial state of the quantum many-body system is processed by the PQC, the output state of the PQC can approximately represent a certain eigenstate of the quantum many-body system as much as possible.

A quantity of layers of the PQC can be adjusted, and each layer includes dual-bit gates $U_0(\vec{\Theta}_1^k)$ and single-bit gates $R_z$ that generate entanglement between different qubits in the quantum many-body system. A $R_z$ quantum gate may be referred to as a rotating quantum gate around a spin z-axis, and a representation form of a matrix thereof is $$Rz = \begin{bmatrix} \exp(-i\theta/2) & 0 \\ 0 & \exp(i\theta/2) \end{bmatrix}.$$

The meaning herein is that the PQC may have one or more layers, and each layer includes several dual-bit gates and several single-bit gates. The entire quantum circuit may be considered as a whole. After the quantum circuit acts on the initial state, an output state is obtained. The output state varies with the parameter in the quantum circuit. It is expected that the quantum circuit has a stronger "expression capability". That is to say, by changing the parameter, it is possible to obtain as many independent output states as possible. The single-bit gate is easier to implement, but contribution thereof to the "expression capability" is generally not as high as that of the dual-bit gate. Therefore, there are both the single-bit gate and the dual-bit gate in the quantum circuit. Functions of the single-bit gate and the dual-bit gate are to improve the "expression capability" of the quantum circuit as much as possible.

In addition, when the quantum many-body system has a specific property, the PQC also needs to maintain the specific property of the quantum many-body system. For example, when the quantum many-body system has the U(1) symmetry, an ansatz of the PQC (that is, a type and an arrangement manner of the quantum gates included in the PQC) also needs to maintain the U(1) symmetry of the quantum many-body system.

In an exemplary embodiment, step 220 may include the following sub-steps:

1. Obtain an optimal parameter of the PQC, the optimal parameter indicating a parameter of the PQC when a target function corresponding to the PQC is caused to converge;
2. Set the parameter of the PQC to the optimal parameter; and
3. Process the initial state by using the PQC with the foregoing optimal parameter, to obtain the output state of the PQC.

The foregoing target function may also be referred to as a loss function. In some embodiments, the target function is an energy variance of the quantum many-body system. The energy variance indicates a difference between an expected value of a square of a Hamiltonian of the quantum many-body system and a square of an expected value of the Hamiltonian of the quantum many-body system. That is, the energy variance=$\langle H^2 \rangle - \langle H \rangle^2$. $\langle H^2 \rangle$ represents the expected value of the square of the Hamiltonian of the quantum many-body system, and $\langle H \rangle^2$ represents the square of the expected value of the Hamiltonian of the quantum many-body system. Only when the output state of the PQC is the eigenstate of the quantum many-body system, the target function is zero.

In some embodiments, the optimal parameter of the PQC is obtained in the following manner: measuring the output state of the PQC, to obtain expected values of a plurality of Pauli strings obtained through decomposition of the energy variance; calculating the energy variance according to the expected values of the plurality of Pauli strings; adjusting the parameter of the PQC with convergence of the energy variance as a goal; and obtaining the parameter of the PQC as the optimal parameter when the energy variance satisfies a convergence condition.

After the energy variance is obtained, a derivative of the energy variance relative to a circuit parameter $\theta$ of the PQC may be calculated by applying parameter translation. By using information of the derivative, a gradient-based optimizer (such as Adam) developed by a classical machine learning community may be used to update the circuit parameter, to complete one iteration of excited state quantum variational eigensolution until the energy variance is converged. In this case, the circuit parameter of the PQC is the optimal parameter.

Step 230: Measure the output state of the PQC through a measurement circuit, and obtain a target parameter index based on a measurement result. The target parameter index is used for determining whether the quantum many-body system is in a many-body localization state.

The target parameter index may be an index used for measuring an approximate degree between the output state of the PQC and the eigenstate of the quantum many-body system. Through this index, the thermalization state may be distinguished from the many-body localization state, thereby determining whether the quantum many-body system is in the thermalization state or in the many-body localization state.

From the perspective of numerical calculation, an EIPR whose value is convenient to calculate is obtained according to the foregoing output state of the PQC that uses the optimal parameter. The value of the EIPR may be used as a witness for determining a degree to which the output state of the PQC converges to a certain excited state of the quantum many-body system. The closer the value of the EIPR is to 1, the closer the output state of the PQC is to a certain eigenstate of the quantum many-body system. Otherwise, it is indicated that the output state of the PQC is still a linear superposition state of the eigenstate of the system. The EIPR calculated according to the output state of the PQC may be calculated based on the foregoing formula "the wave function $|\psi\rangle = \Sigma_i \phi_i |i\rangle$, where $H|i\rangle = \lambda_i |i\rangle$, and the EIPR is defined as $\Sigma_i |\phi_i|^4$". It is found that when the PQC is given the same input state (the input state of the PQC is the initial state of the quantum many-body system prepared by the preparation circuit) and the PQC has the same structure, an effect of convergence of the many-body localization state to the eigenstate of the system is obviously better, that is, an EIPR of the many-body localization state is significantly greater than an EIPR of the thermalization state. Although the EIPR is a good index for distinguishing the thermalization state from the many-body localization state, the EIPR is defined in an eigenspace and is not an experimentally observable quantity. Therefore, this application further provides an experimentally measurable entanglement criterion, which is used as the target parameter index for determining whether the quantum many-body system is in the many-body localization state.

In an exemplary embodiment, by introducing an auxiliary qubit, an entanglement criterion of the auxiliary qubit is obtained, and then based on the entanglement criterion of the auxiliary qubit, it is determined whether the quantum many-body system is in the many-body localization state.

In some embodiments, the target parameter index includes the entanglement criterion of the auxiliary qubit. The foregoing step 230 may include the following several sub-steps:

1. Control the auxiliary qubit to be in a superposition state.

The auxiliary qubit is controlled to be in a normalized eigenstate with an eigenvalue of the Pauli operator $\sigma_x$ being 1.

As shown in FIG. 1, an initial state of the auxiliary qubit may be a 10) state and be changed into a superposition state after passing through a Hadamard gate represented by H in FIG. 1. The auxiliary qubit in the superposition state is used as a control qubit to control the time evolution of the quantum many-body system.

2. Control, based on the auxiliary qubit, the quantum many-body system to perform controlled time evolution through the measurement circuit.

In some embodiments, the state of the quantum many-body system is maintained unchanged when the auxiliary qubit is in the 0 state, and the quantum many-body system is controlled to perform time evolution when the auxiliary qubit is in the 1 state.

3. Measure expected values of a plurality of spin components of the auxiliary qubit.

In some embodiments, expected values of a spin x-component, a spin y-component, and a spin z-component of the auxiliary qubit are measured.

4. Obtain a reduced density matrix of the auxiliary qubit based on the expected values of the plurality of spin components of the auxiliary qubit.

In some embodiments, the reduced density matrix of the auxiliary qubit is obtained based on the expected values of the spin x-component, the spin y-component, and the spin z-component of the auxiliary qubit.

5. Obtain the entanglement criterion of the auxiliary qubit according to the reduced density matrix of the auxiliary qubit.

In some embodiments, the entanglement criterion of the auxiliary qubit is equal to $\text{Tr}(\rho^2)$, that is, a trace of the matrix after the square of the reduced density matrix $\rho$.

The entanglement criterion can also represent a degree to which the output state of the PQC converges to the eigenstate of the system after the action of the "excited state variational quantum eigensolver". The many-body localization state has a better convergence effect, and an entanglement criterion thereof is significantly greater than an entanglement criterion of the thermalization state. In addition, it is numerically found that the depth of the PQC required for optimizing the many-body localization state to a "valid zero point" is a magnitude of $O(n)$, which is much less that a magnitude of $O(2^n)$ required for the thermalization state.

Step 240: Determine, when the target parameter index satisfies a condition, that the quantum many-body system is in the many-body localization state.

In some embodiments, when the entanglement criterion is greater than or equal to a threshold, it is determined that the quantum many-body system is in the many-body localization state. The threshold may be a value set with reference to experiments or experience.

In addition, when the target parameter index does not satisfy the condition, it is determined that the quantum many-body system is not in the many-body localization state, for example, it is determined that the quantum many-body system is in the thermalization state.

In this application, by using an "excited state variational quantum eigensolver" as a tool, a many-body localization state is determined and analyzed, and by constructing a system architecture that includes a preparation circuit, a PQC, and a measurement circuit, the many-body localization state is studied through the excited state variational quantum eigensolver on a quantum circuit. By taking advantage of the quantum advantage, it is possible to study the many-body localization state in a larger and higher-dimensional system that cannot be studied before due to a classical calculation limit. In addition, compared with a conventional method in which the many-body localization state is determined by performing time evolution, here, in this application, the many-body localization state is determined by performing "controlled time evolution" to measure an entanglement criterion, and therefore quantum resources required are less, a depth of the circuit is shallower, and influence caused by noise is smaller.

In addition, in an embodiment of this application, the quantum many-body system is controlled to perform controlled time evolution based on the auxiliary qubit. This way, based on the entanglement criterion of the auxiliary qubit, it is determined whether the quantum many-body system is in the many-body localization state. The entanglement criterion of the auxiliary qubit is easier to measure and solve, and therefore in this manner, it is simpler and more efficient to determine whether the quantum many-body system is in the many-body localization state. Further, since the entanglement criterion can also represent the degree to which the output state of the PQC converges to the eigenstate of the system after the action of the "excited state variational quantum eigensolver", the many-body localization state has the better convergence effect, and the entanglement criterion thereof is significantly greater than the entanglement criterion of the thermalization state, whether the quantum many-body system is in the many-body localization state can be accurately and effectively distinguished based on the entanglement criterion.

In addition, in this embodiment of this application, when the quantum many-body system has a specific property, the PQC maintains the specific property of the quantum many-body system, or the second sub-circuit in the preparation circuit maintains the specific property of the quantum many-body system, which can ensure that the property of the quantum many-body system does not change during processing processes performed by the preparation circuit and the PQC, thereby helping improve accuracy of finally determining whether the quantum many-body system is in the many-body localization state.

An experimental case of using this solution (that is, the solution in which the many-body localization state is determined by using an "excited state variational quantum eigensolver" described in the foregoing embodiments) in specific model study is described below. The Aubry-André (AA) model that is very important in the condensed matter physics and known to have the many-body localization phase transition is considered to verify the effectiveness of this solution. In addition, a numerical calculation result and an implementation effect on actual quantum hardware of this solution are shown through experimental data.

Result 1: A numerical result of the many-body localization state is determined by using this solution.

Figure 3:
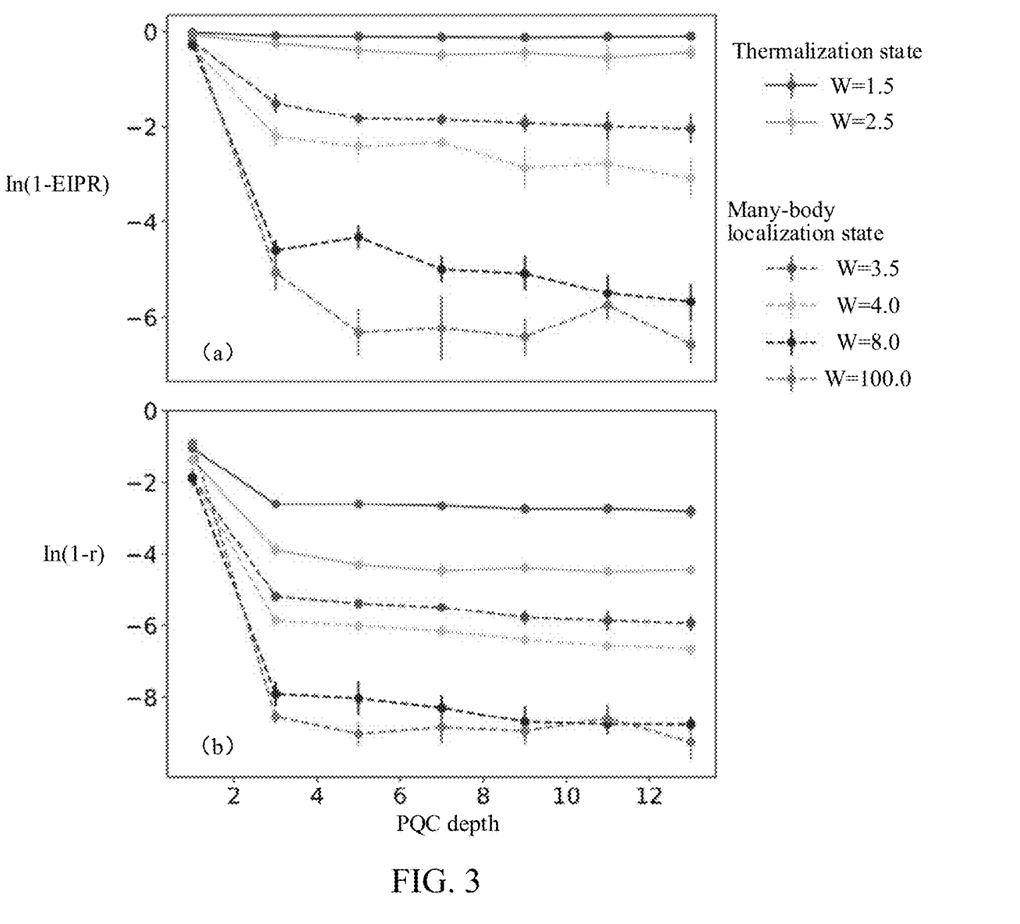
FIG. 3 is a schematic diagram of using a solution of this application to determine a value result of a many-body localization state.

By using this solution, an eigenstate of the one-dimensional AA model with interactions is calculated. The calculated system has 12 lattice points. After the target function of the PQC converges, an EIPR of the output state of the PQC and an entanglement criterion r are numerically calculated, and results are shown in FIG. 3. It can be seen that there is a significant difference between the thermalization state and the many-body localization state. A result of W=100 (W is the parameter W in the Hamiltonian expression of the AA model provided above) may be used as the "equivalent zero point", and depths of the PQC required to reach the "equivalent zero point" for other parameters are shown in Table 1 below. There is a difference between magnitudes in the depths of the PQC required for the thermalization state and the many-body localization state.

TABLE 1

| W | 1.5 | 2.5 | 3.5 | 4.0 | 8.0 |
|---|---|---|---|---|---|
| PQC depth | 245 | 256 | 52 | 38 | 14 |

Result 2: An experimental result of the many-body localization state is determined by using this solution.

Figure 4:
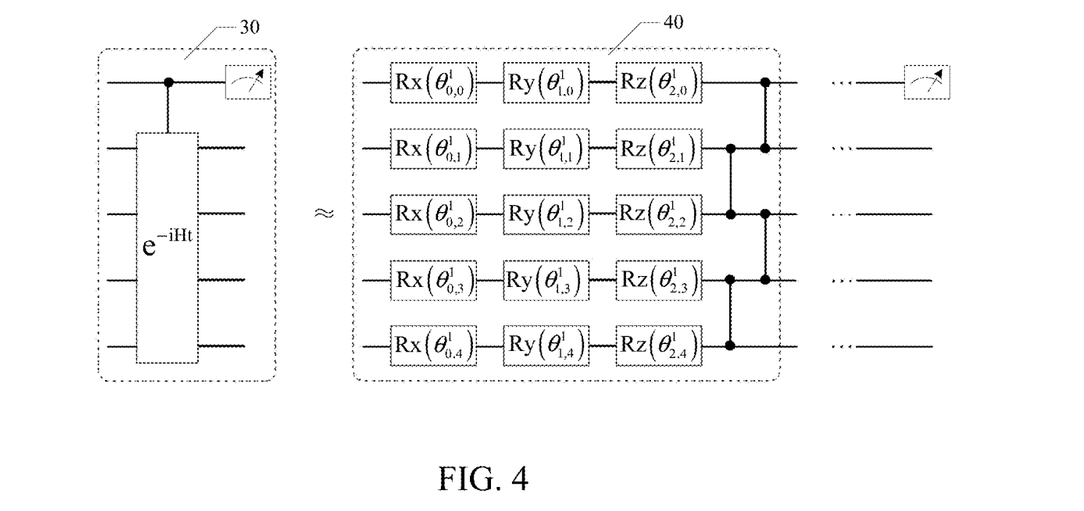
FIG. 4 is a schematic diagram of using a variational quantum circuit to approximate controlled time evolution according to an embodiment of this application.

To measure the entanglement criterion experimentally, there is a need to perform time evolution shown in FIG. 1 on the system. Time evolution can be better implemented through Trotter decomposition, but a quantity of dual-bit gates required by the Trotter decomposition is relatively large, which is not NISQ friendly. In this case, a hardware-friendly ansatz is used. Through a general variational optimization method, a variational quantum circuit is found to approximate the time evolution, with accuracy of more than 97%, which greatly saves the quantum resources, and reduces the influence caused by noise. An implementation form thereof is shown in FIG. 4. A variational quantum circuit 40 is used to replace the measurement circuit 30 in the architecture shown in FIG. 1. A quantity of layers of the variational quantum circuit 40 can be adjusted, and each lay includes a single-bit rotating gate and a CZ gate that generates entanglement between different qubits.

Figure 5:
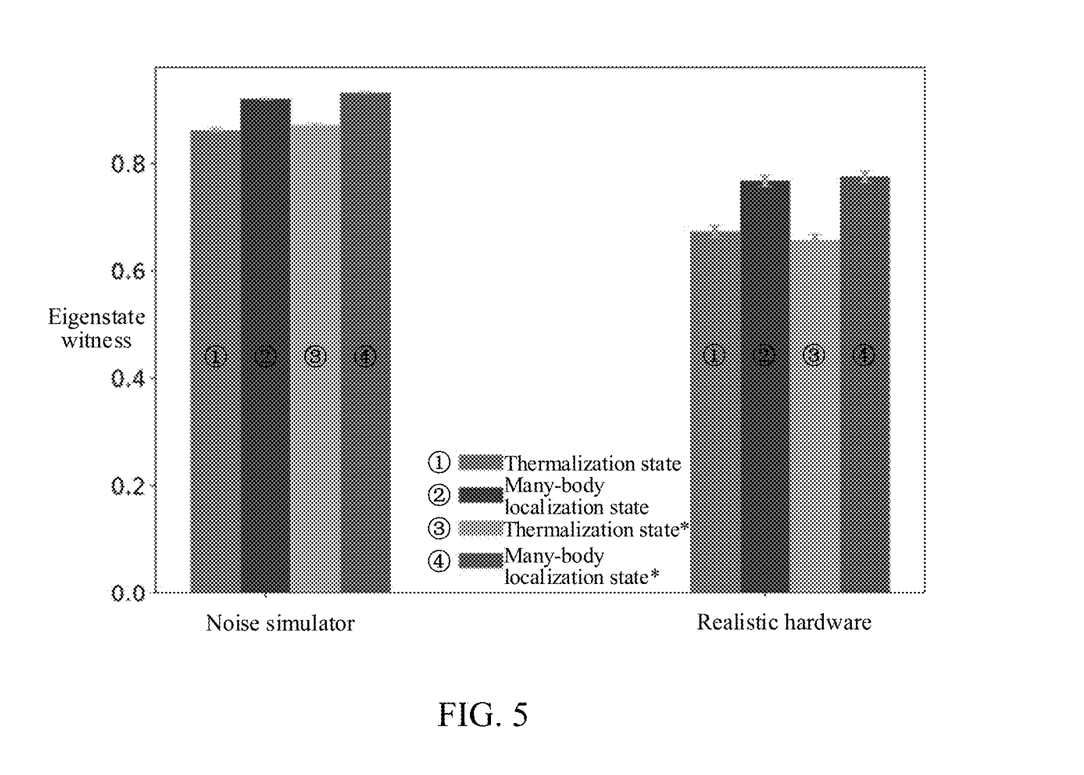
FIG. 5 is a schematic diagram of determining an experimental result of a many-body localization state based on an entanglement criterion.

An entanglement criterion of a system with four lattice points is calculated based on a more realistic noise simulator and quantum computer hardware of a superconducting quantum computer provided by a company. When a number of layers in a VQE part is 1, and a number of layers in a PQC part is 6, a result of the entanglement criterion is shown in FIG. 5 (* indicates that the inherent measurement error has been considered in the result), and the thermalization state can still be well distinguished from the many-body localization state. This further demonstrate an application prospect of this solution for quantum computers.

The following are system embodiments of this application. The system embodiments and the foregoing method embodiments correspond to each other and belong to the same invention concept. For details that are not elaborated in the system embodiments, reference is made to the method embodiments of this application.

An exemplary embodiment of this application further provides a system for determining a many-body localization state. The system may include: a preparation circuit, a PQC, a measurement circuit, and a classical calculation module, the preparation circuit being configured to prepare an initial state of a quantum many-body system, the quantum many-body system including a plurality of qubits;

the PQC being configured to process the initial state, to obtain an output state of the PQC, the output state of the PQC being used for approximately representing an eigenstate of the quantum many-body system;

the measurement circuit being configured to measure the output state of the PQC; and the classical calculation module being configured to: obtain a target parameter index based on a measurement result of the measurement circuit, the target parameter index being used for determining whether the quantum many-body system is in a many-body localization state; and determine, when the target parameter index satisfies a condition, that the quantum many-body system is in the many-body localization state.

In some embodiments, the target parameter index includes an entanglement criterion of an auxiliary qubit;

the measurement circuit is configured to: control the quantum many-body system to perform controlled time evolution based on the auxiliary qubit, and measure expected values of a spin x-component, a spin y-component, and a spin z-component of the auxiliary qubit, the auxiliary qubit being in a superposition state; and the classical calculation module is configured to obtain a reduced density matrix of the auxiliary qubit based on the expected values of the spin x-component, the spin y-component, and the spin z-component of the auxiliary qubit, and obtain the entanglement criterion of the auxiliary qubit according to the reduced density matrix of the auxiliary qubit.

In some embodiments, the classical calculation module is further configured to determine, when the entanglement criterion is greater than or equal to a threshold, that the quantum many-body system is in the many-body localization state.

In some embodiments, the measurement circuit is configured to: maintain a state of the quantum many-body system unchanged when the auxiliary qubit is in a 0 state; and control the quantum many-body system to perform time evolution when the auxiliary qubit is in a 1 state.

In some embodiments, the PQC is configured to process, when an optimal parameter is used, the initial state to obtain the output state of the PQC, the optimal parameter indicating a parameter of the PQC when a target function corresponding to the PQC is caused to converge.

In some embodiments, the target function is an energy variance of the quantum many-body system. The energy variance indicates a difference between an expected value of a square of a Hamiltonian of the quantum many-body system and a square of an expected value of the Hamiltonian of the quantum many-body system.

A process of obtaining the optimal parameter is as follows:

measuring expected values of a plurality of Pauli strings obtained through decomposition of the energy variance;

calculating the energy variance according to the expected values of the plurality of Pauli strings;

adjusting the parameter of the PQC with convergence of the energy variance as a goal; and obtaining the parameter of the PQC as the optimal parameter when the energy variance satisfies a convergence condition.

In some embodiments, the preparation circuit is configured to process the input state of the preparation circuit, to obtain the initial state of the quantum many-body system.

In some embodiments, the preparation circuit includes a first sub-circuit and a second sub-circuit.

The first sub-circuit is configured to process the input state of the preparation circuit, to obtain an output state of the first sub-circuit, the output state of the first sub-circuit being an antiferromagnetic state.

The second sub-circuit is configured to: process the output state of the first sub-circuit, to obtain the initial state of the quantum many-body system; and generate entanglement between different qubits.

In some embodiments, the PQC maintains, when the quantum many-body system has a specific property, the specific property of the quantum many-body system, the specific property indicating conservation of magnetization.

An exemplary embodiment of this application further provides a computer device. The computer device is configured to perform the foregoing method for determining a many-body localization state.

That is, the method for determining a many-body localization state provided in this application may be performed by a computer device. The computer device may be a hybrid device environment of a classical computer and a quantum computer, for example, the method is implemented through the cooperation of the classical computer and the quantum computer. In the hybrid device environment of a classical computer and a quantum computer, the classical computer executes a computer program to implement some classical calculation and control on the quantum computer, and the quantum computer implements operations such as control and measurement of a qubit. For example, the foregoing preparation circuit, PQC and measurement circuit can be set in the quantum computer, and the computer program is executed by the classical computer to control the quantum computer. The quantum computer is controlled to perform operations such as preparing the initial state of the quantum many-body system through the preparation circuit, processing the initial state through the PQC to obtain the output state of the PQC, and measuring the output state of the PQC through the measurement circuit. In addition, the classical computer may further execute the computer program to implement some classical calculation, for example, to implement operations such as obtaining the target parameter index based on the measurement result, determining whether the target parameter index satisfies the condition, and determining, when the target parameter index satisfies the condition, that the quantum many-body system is in the many-body localization state.

In some embodiments, the foregoing computer device may alternatively be an independent classical computer, that is, steps of the method for determining a many-body localization state provide in this application are performed by the classical computer, for example, the classical computer executes a computer program to perform numerical experiment simulation on the foregoing method; or the foregoing computer device may alternatively be an independent quantum computer, that is, steps of the method for determining a many-body localization state provided in this application are performed by the quantum computer. This is not limited in this application.

An exemplary embodiment of this application further provides a non-transitory computer-readable storage medium. The computer-readable storage medium stores at least one instruction, at least one program, a code set, or an instruction set, the at least one instruction, the at least one program, the code set, or the instruction set being loaded and executed by a processor to implement the foregoing method for determining a many-body localization state.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

An exemplary embodiment of this application further provides a computer program product or a computer program, the computer program product or the computer program including computer instructions, the computer instructions being stored in a computer-readable storage medium, a processor of a computer device reading the computer instructions from the computer-readable storage medium, and the processor executing the computer instructions to implement the foregoing method for determining a many-body localization state.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely examples of the embodiments of this application, but are not intended to limit this application. Any modification, equivalent replacement, or improvement made without departing from the spirit and principle of this application should fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs preparation and/or measurement. In practical application, the foregoing functions may be allocated to and completed by different functional modules according to requirements, that is, an inner structure of a device is divided into different functional modules to implement all or a part of the functions described above.

What is claimed is:

1. A method for determining a many-body localization state comprising:
preparing an initial state of a quantum many-body system through a preparation circuit, the quantum many-body system including a plurality of qubits;
processing the initial state through a parameterized quantum circuit (PQC) to obtain an output state of the PQC, wherein the output state of the PQC is used for representing an eigenstate of the quantum many-body system;
measuring the output state of the PQC through a measurement circuit;
obtaining a target parameter index based on the measured output state, wherein the target parameter index is used for determining whether the quantum many-body system is in a many-body localization state; and
in accordance with a determination that the target parameter index satisfies a condition, determining that the quantum many-body system is in the many-body localization state.

2. The method according to claim 1, wherein the target parameter index comprises an entanglement criterion of an auxiliary qubit; and
measuring the output state of the PQC through a measurement circuit includes:
controlling the auxiliary qubit to be in a superposition state;
controlling, based on the auxiliary qubit, the quantum many-body system to perform controlled time evolution through the measurement circuit;
measuring expected values of a spin x-component, a spin y-component, and a spin z-component of the auxiliary qubit;
obtaining a reduced density matrix of the auxiliary qubit based on the expected values of the spin x-component, the spin y-component, and the spin z-component of the auxiliary qubit; and
obtaining the entanglement criterion of the auxiliary qubit according to the reduced density matrix of the auxiliary qubit.

3. The method according to claim 2, further comprising:
determining, when the entanglement criterion is greater than or equal to a threshold, that the quantum many-body system is in the many-body localization state.

4. The method according to claim 2, wherein controlling the quantum many-body system to perform controlled time evolution includes:
maintaining a state of the quantum many-body system unchanged when the auxiliary qubit is in a 0 state; and
controlling the quantum many-body system to perform time evolution when the auxiliary qubit is in a 1 state.

5. The method according to claim 1, wherein processing the initial state through the PQC to obtain the output state of the PQC comprises:
obtaining an optimal parameter of the PQC, the optimal parameter indicating a parameter of the PQC when a target function corresponding to the PQC is caused to converge;
setting the parameter of the PQC to the optimal parameter; and
processing the initial state through the PQC, to obtain the output state of the PQC.

6. The method according to claim 5, wherein:
the target function is an energy variance of the quantum many-body system, the energy variance indicating a difference between an expected value of a square of a Hamiltonian of the quantum many-body system and a square of an expected value of the Hamiltonian of the quantum many-body system; and
obtaining the optimal parameter of the PQC includes:
measuring expected values of a plurality of Pauli strings obtained through decomposition of the energy variance;
calculating the energy variance according to the expected values of the plurality of Pauli strings;
adjusting the parameter of the PQC with convergence of the energy variance as a goal; and
obtaining the parameter of the PQC as the optimal parameter when the energy variance satisfies a convergence condition.

7. The method according to claim 1, wherein preparing the initial state of a quantum many-body system through the preparation circuit includes:
preparing an input state of the preparation circuit; and
processing the input state of the preparation circuit through the preparation circuit to obtain the initial state of the quantum many-body system.

8. The method according to claim 7, wherein the preparation circuit includes a first sub-circuit and a second sub-circuit; and
processing the input state of the preparation circuit includes:
processing the input state of the preparation circuit through the first sub-circuit to obtain an output state of the first sub-circuit, wherein the output state of the first sub-circuit corresponds to an antiferromagnetic state; and
processing the output state of the first sub-circuit through the second sub-circuit to obtain the initial state of the quantum many-body system, wherein the second sub-circuit is configured to generate entanglement between different qubits.

9. The method according to claim 1, wherein the PQC maintains, when the quantum many-body system has a specific property, the specific property of the quantum many-body system, and the specific property indicates conservation of magnetization.

10. A computer system, comprising:
a preparation circuit configured to prepare an initial state of a quantum many-body system, the quantum many-body system including a plurality of qubits;
a parameterized quantum circuit (PQC) configured to process the initial state to obtain an output state of the PQC, wherein the output state of the PQC is used for representing an eigenstate of the quantum many-body system;
a measurement circuit configured to measure the output state of the PQC; and
a calculation module configured to:
obtain a target parameter index based on the measured output state;
use the target parameter index for determining whether the quantum many-body system is in a many-body localization state; and
in accordance with a determination that the target parameter index satisfies a condition, determine that the quantum many-body system is in the many-body localization state.

11. The computer system according to claim 10, wherein the target parameter index comprises an entanglement criterion of an auxiliary qubit; and
the measurement circuit is configured to measure the output state of the PQC by:
controlling the auxiliary qubit to be in a superposition state;
controlling, based on the auxiliary qubit, the quantum many-body system to perform controlled time evolution through the measurement circuit;
measuring expected values of a spin x-component, a spin y-component, and a spin z-component of the auxiliary qubit;
obtaining a reduced density matrix of the auxiliary qubit based on the expected values of the spin x-component, the spin y-component, and the spin z-component of the auxiliary qubit; and
obtaining the entanglement criterion of the auxiliary qubit according to the reduced density matrix of the auxiliary qubit.

12. The computer system according to claim 11, wherein the measurement circuit is configured to:
determine, when the entanglement criterion is greater than or equal to a threshold, that the quantum many-body system is in the many-body localization state.

13. The computer system according to claim 11, wherein controlling the quantum many-body system to perform controlled time evolution includes:
maintaining a state of the quantum many-body system unchanged when the auxiliary qubit is in a 0 state; and
controlling the quantum many-body system to perform time evolution when the auxiliary qubit is in a 1 state.

14. The computer system according to claim 10, wherein the PQC is configured to process the initial state to obtain the output state of the PQC by:
obtaining an optimal parameter of the PQC, the optimal parameter indicating a parameter of the PQC when a target function corresponding to the PQC is caused to converge;
setting the parameter of the PQC to the optimal parameter; and
processing the initial state through the PQC, to obtain the output state of the PQC.

15. The computer system according to claim 14, wherein:
the target function is an energy variance of the quantum many-body system, the energy variance indicating a difference between an expected value of a square of a Hamiltonian of the quantum many-body system and a square of an expected value of the Hamiltonian of the quantum many-body system; and
obtaining the optimal parameter of the PQC includes:
measuring expected values of a plurality of Pauli strings obtained through decomposition of the energy variance;
calculating the energy variance according to the expected values of the plurality of Pauli strings;
adjusting the parameter of the PQC with convergence of the energy variance as a goal; and
obtaining the parameter of the PQC as the optimal parameter when the energy variance satisfies a convergence condition.

16. The computer system according to claim 10, wherein the preparation circuit is configured to prepare the initial state of a quantum many-body system by:
preparing an input state of the preparation circuit; and
processing the input state of the preparation circuit through the preparation circuit to obtain the initial state of the quantum many-body system.

17. The computer system according to claim 16, wherein the preparation circuit includes a first sub-circuit and a second sub-circuit; and
processing the input state of the preparation circuit includes:
processing the input state of the preparation circuit through the first sub-circuit to obtain an output state of the first sub-circuit, wherein the output state of the first sub-circuit corresponds to an antiferromagnetic state; and
processing the output state of the first sub-circuit through the second sub-circuit to obtain the initial state of the quantum many-body system, wherein the second sub-circuit is configured to generate entanglement between different qubits.

18. A non-transitory computer-readable storage medium, storing a computer program, the computer program, when executed by a computer system having a preparation circuit, a parameterized quantum circuit (PQC), a measurement circuit, and a calculation module, cause the computer system to perform operations comprising:
preparing an initial state of a quantum many-body system through the preparation circuit, the quantum many-body system comprising a plurality of qubits;
processing the initial state through the parameterized quantum circuit (PQC) to obtain an output state of the PQC, wherein the output state of the PQC is used for representing an eigenstate of the quantum many-body system;
measuring the output state of the PQC through the measurement circuit;
obtaining, by the calculation module, a target parameter index based on the measured output state, wherein the target parameter index is used for determining whether the quantum many-body system is in a many-body localization state; and
in accordance with a determination that the target parameter index satisfies a condition, determining by the calculation module that the quantum many-body system is in the many-body localization state.

19. The non-transitory computer-readable storage medium according to claim 18, wherein the target parameter index comprises an entanglement criterion of an auxiliary qubit; and     measuring the output state of the PQC through the measurement circuit includes:
        controlling the auxiliary qubit to be in a superposition state;
        controlling, based on the auxiliary qubit, the quantum many-body system to perform controlled time evolution through the measurement circuit;
        measuring expected values of a spin x-component, a spin y-component, and a spin z-component of the auxiliary qubit;
        obtaining a reduced density matrix of the auxiliary qubit based on the expected values of the spin x-component, the spin y-component, and the spin z-component of the auxiliary qubit; and
        obtaining the eigenstate witness of the auxiliary qubit according to the reduced density matrix of the auxiliary qubit.

20. The non-transitory computer-readable storage medium according to claim 19, wherein controlling the quantum many-body system to perform controlled time evolution includes:

maintaining a state of the quantum many-body system unchanged when the auxiliary qubit is in a 0 state; and
    controlling the quantum many-body system to perform time evolution when the auxiliary qubit is in a 1 state.

\* \* \* \* \*